United States Patent
Kane

(10) Patent No.: US 8,641,496 B2
(45) Date of Patent: Feb. 4, 2014

(54) SYSTEM AND METHOD FOR CONDUCTING A GAME

(75) Inventor: Steven N. Kane, Brookline, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 878 days.

(21) Appl. No.: 11/106,023

(22) Filed: Apr. 14, 2005

(65) Prior Publication Data

US 2005/0233791 A1 Oct. 20, 2005

Related U.S. Application Data

(60) Provisional application No. 60/563,138, filed on Apr. 16, 2004.

(51) Int. Cl.
*G06F 17/00* (2006.01)

(52) U.S. Cl.
USPC .................................. 463/6; 463/42

(58) Field of Classification Search
USPC ...................................... 463/6, 42
See application file for complete search history.

(56) References Cited

U.S. PATENT DOCUMENTS

| | | |
|---|---|---|
| 4,494,197 A | 1/1985 | Troy et al. |
| 4,582,324 A | 4/1986 | Koza et al. |
| 4,679,789 A | 7/1987 | Okada |
| 4,689,742 A | 8/1987 | Troy et al. |
| 4,725,079 A | 2/1988 | Koza et al. |
| 4,764,666 A | 8/1988 | Bergeron |
| 4,882,473 A | 11/1989 | Bergeron et al. |
| 4,922,522 A | 5/1990 | Scanlon |
| 5,158,293 A | 10/1992 | Mullins |
| 5,324,035 A | 6/1994 | Morris et al. |
| 5,373,440 A | 12/1994 | Cohen |
| 5,377,975 A | 1/1995 | Clapper, Jr. |
| 5,398,932 A | 3/1995 | Eberhardt et al. |
| 5,569,082 A | 10/1996 | Kaye |
| 5,586,937 A | 12/1996 | Menashe |
| 5,628,684 A | 5/1997 | Bouedec |
| 5,645,485 A | 7/1997 | Clapper, Jr. |
| 5,653,635 A | 8/1997 | Breeding |
| 5,709,603 A | 1/1998 | Kaye |
| 5,722,891 A | 3/1998 | Inoue |
| 5,749,784 A | 5/1998 | Clapper, Jr. |
| 5,768,382 A | 6/1998 | Schneier et al. |
| 5,772,511 A | 6/1998 | Smeltzer |

(Continued)

FOREIGN PATENT DOCUMENTS

WO    WO 91/06931    5/1991

OTHER PUBLICATIONS

Merriam-Webster Online, <http://www.merriam-webster.com/dictionary/race[1]>, definition 4c.*

(Continued)

*Primary Examiner* — Michael Cuff

(74) *Attorney, Agent, or Firm* — Dority & Manning, P.A.

(57) ABSTRACT

A game system is provided that conducts a game having one or more players. In the game, players compete in a number of gaming sessions to achieve an ultimate goal. In one example, the ultimate goal is to win a race, with the players' progress in the race being influenced by each players' success within individual game sessions. In one example, at least one of the game sessions is a guts poker game played among a number of players.

46 Claims, 9 Drawing Sheets

(56) References Cited

U.S. PATENT DOCUMENTS

| | | | |
|---|---|---|---|
| RE35,864 E * | 7/1998 | Weingardt | 463/28 |
| 5,788,573 A | 8/1998 | Baerlocher et al. | |
| 5,791,990 A | 8/1998 | Schroeder et al. | |
| 5,810,664 A | 9/1998 | Clapper, Jr. | |
| 5,823,873 A | 10/1998 | Moody | |
| 5,823,874 A | 10/1998 | Adams | |
| 5,830,069 A | 11/1998 | Soltesz et al. | |
| 5,848,932 A | 12/1998 | Adams | |
| 5,860,653 A | 1/1999 | Jacobs | |
| 5,871,398 A | 2/1999 | Schneier et al. | |
| 5,882,258 A | 3/1999 | Kelly et al. | |
| 5,887,906 A | 3/1999 | Sultan | |
| 5,928,082 A | 7/1999 | Clapper, Jr. et al. | |
| 5,971,849 A * | 10/1999 | Falciglia | 463/16 |
| 6,007,426 A | 12/1999 | Kelly et al. | |
| 6,012,983 A | 1/2000 | Walker et al. | |
| 6,028,920 A | 2/2000 | Carson | |
| 6,044,135 A | 3/2000 | Katz | |
| 6,048,269 A | 4/2000 | Burns et al. | |
| 6,059,289 A | 5/2000 | Vancura | |
| 6,077,163 A | 6/2000 | Walker et al. | |
| 6,106,393 A | 8/2000 | Sunaga et al. | |
| 6,146,272 A | 11/2000 | Walker et al. | |
| 6,152,823 A | 11/2000 | Lacoste et al. | |
| 6,159,097 A | 12/2000 | Gura | |
| 6,162,121 A | 12/2000 | Morro et al. | |
| 6,179,711 B1 | 1/2001 | Yoseloff | |
| 6,186,892 B1 | 2/2001 | Frank et al. | |
| 6,203,427 B1 | 3/2001 | Walker et al. | |
| 6,236,900 B1 | 5/2001 | Geiger | |
| 6,251,017 B1 | 6/2001 | Leason et al. | |
| 6,283,855 B1 | 9/2001 | Bingham | |
| 6,311,976 B1 | 11/2001 | Yoseloff et al. | |
| 6,312,334 B1 | 11/2001 | Yoseloff | |
| 6,358,151 B1 | 3/2002 | Enzminger et al. | |
| 6,364,765 B1 | 4/2002 | Walker et al. | |
| 6,368,214 B1 | 4/2002 | Luciano | |
| 6,368,218 B2 | 4/2002 | Angell, Jr. | |
| 6,375,567 B1 | 4/2002 | Acres | |
| 6,394,902 B1 | 5/2002 | Glavich et al. | |
| 6,402,614 B1 | 6/2002 | Schneier et al. | |
| 6,471,208 B2 | 10/2002 | Yoseloff et al. | |
| 6,488,280 B1 | 12/2002 | Katz et al. | |
| 6,514,144 B2 | 2/2003 | Riendeau et al. | |
| 6,523,829 B1 | 2/2003 | Walker et al. | |
| 6,527,175 B1 | 3/2003 | Dietz et al. | |
| 6,540,230 B1 | 4/2003 | Walker et al. | |
| 6,565,084 B1 | 5/2003 | Katz et al. | |
| 6,572,107 B1 | 6/2003 | Walker et al. | |
| 6,575,832 B1 | 6/2003 | Manfredi et al. | |
| 6,582,307 B2 | 6/2003 | Webb | |
| 6,588,747 B1 | 7/2003 | Seelig | |
| 6,607,439 B2 | 8/2003 | Schneier et al. | |
| 6,612,501 B1 | 9/2003 | Woll et al. | |
| 6,612,574 B1 | 9/2003 | Cole et al. | |
| 6,619,660 B2 | 9/2003 | Schaefer et al. | |
| 6,625,578 B2 | 9/2003 | Spaur et al. | |
| 6,645,074 B2 | 11/2003 | Thomas et al. | |
| 6,656,042 B2 | 12/2003 | Reiss et al. | |
| 6,663,105 B1 | 12/2003 | Sullivan et al. | |
| 6,676,126 B1 | 1/2004 | Walker et al. | |
| 6,679,497 B2 | 1/2004 | Walker et al. | |
| 6,681,995 B2 | 1/2004 | Sukeda et al. | |
| 6,682,419 B2 | 1/2004 | Webb et al. | |
| D486,869 S | 2/2004 | Webb et al. | |
| 6,685,561 B2 | 2/2004 | Anderson et al. | |
| 6,692,353 B2 | 2/2004 | Walker et al. | |
| 6,705,944 B2 | 3/2004 | Luciano | |
| 6,716,103 B1 | 4/2004 | Eck et al. | |
| 6,719,631 B1 | 4/2004 | Tulley et al. | |
| 6,729,956 B2 | 5/2004 | Wolf et al. | |
| 6,733,385 B1 | 5/2004 | Enzminger et al. | |
| 6,749,198 B2 | 6/2004 | Katz et al. | |
| 6,811,484 B2 | 11/2004 | Katz et al. | |
| 6,824,467 B2 | 11/2004 | Schlottmann et al. | |
| 6,843,724 B2 | 1/2005 | Walker et al. | |
| 6,855,052 B2 | 2/2005 | Weiss et al. | |
| 6,899,622 B2 | 5/2005 | Lind et al. | |
| 6,918,589 B2 | 7/2005 | Thibault | |
| 6,942,570 B2 | 9/2005 | Schneier et al. | |
| 7,008,317 B2 | 3/2006 | Cote et al. | |
| 7,192,352 B2 * | 3/2007 | Walker et al. | 463/42 |
| 2002/0013167 A1 | 1/2002 | Spaur et al. | |
| 2002/0052229 A1 | 5/2002 | Halliburton et al. | |
| 2002/0061778 A1 | 5/2002 | Acres | |
| 2002/0077173 A1 | 6/2002 | Luciano et al. | |
| 2002/0090986 A1 | 7/2002 | Cote et al. | |
| 2002/0090987 A1 | 7/2002 | Walker et al. | |
| 2002/0098882 A1 | 7/2002 | Lind et al. | |
| 2002/0147040 A1 | 10/2002 | Walker et al. | |
| 2002/0155885 A1 | 10/2002 | Shvili | |
| 2002/0169018 A1 | 11/2002 | Schneier et al. | |
| 2002/0187827 A1 | 12/2002 | Blankstein | |
| 2002/0193158 A1 | 12/2002 | Weiss et al. | |
| 2002/0198038 A1 | 12/2002 | Adams | |
| 2003/0027628 A1 | 2/2003 | Luciano | |
| 2003/0027639 A1 * | 2/2003 | Peterson et al. | 463/42 |
| 2003/0045340 A1 | 3/2003 | Roberts | |
| 2003/0060257 A1 | 3/2003 | Katz et al. | |
| 2003/0060261 A1 | 3/2003 | Katz et al. | |
| 2003/0069068 A1 | 4/2003 | Kaminkow | |
| 2003/0080508 A1 | 5/2003 | Thibault | |
| 2003/0102625 A1 | 6/2003 | Katz et al. | |
| 2003/0114217 A1 | 6/2003 | Walker et al. | |
| 2003/0119581 A1 | 6/2003 | Cannon et al. | |
| 2003/0139214 A1 | 7/2003 | Wolf et al. | |
| 2003/0155715 A1 | 8/2003 | Walker et al. | |
| 2003/0176212 A1 | 9/2003 | Schlottmann et al. | |
| 2003/0186739 A1 | 10/2003 | Paulsen et al. | |
| 2003/0195841 A1 | 10/2003 | Ginsberg et al. | |
| 2003/0218303 A1 | 11/2003 | Walker et al. | |
| 2004/0036212 A1 | 2/2004 | Walker et al. | |
| 2004/0038723 A1 | 2/2004 | Schneier et al. | |
| 2004/0051240 A1 | 3/2004 | Adams | |
| 2004/0053683 A1 | 3/2004 | Hartl et al. | |
| 2004/0063484 A1 | 4/2004 | Dreaper et al. | |
| 2004/0097287 A1 * | 5/2004 | Postrel | 463/41 |
| 2004/0102238 A1 | 5/2004 | Taylor | |
| 2004/0127279 A1 | 7/2004 | Gatto et al. | |
| 2004/0133472 A1 | 7/2004 | Leason et al. | |
| 2004/0142741 A1 | 7/2004 | Walker et al. | |
| 2004/0147308 A1 | 7/2004 | Walker et al. | |
| 2005/0049042 A1 | 3/2005 | Walker et al. | |
| 2005/0075158 A1 | 4/2005 | Walker et al. | |
| 2005/0187012 A1 * | 8/2005 | Walker et al. | 463/25 |

OTHER PUBLICATIONS

Rules of Pai Gow Poker. Casino City. Dec. 3, 2000. Online: http://web.archive.org/web/20001203170300/http://www.casinocity.com/rule/paigow.htm.

* cited by examiner

SYSTEM AND METHOD FOR CONDUCTING A GAME

RELATED APPLICATIONS

This application claims priority under 35 U.S.C. §119(e) to U.S. Provisional Application Ser. No. 60/563,138 entitled "SYSTEM AND METHOD FOR CONDUCTING A GAME," filed on Apr. 16, 2004, and this application is herein incorporated by reference in its entirety.

BACKGROUND OF THE INVENTION

1. Field of the Invention

The field of the invention relates generally to gaming, and more particularly to games of skill and/or chance.

2. Discussion of the Related Art

Casino games are popular, and recently many varieties of new casino games have been introduced, especially those that can be played over a network such as the Internet. These games allow, in some jurisdictions, players to make bets and win prizes as if they were playing in a casino. The Internet has gained a great deal of popularity on certain "betting" card games, such as blackjack. The rules of these types of games are similar to those played in a casino, and therefore, these games have similar odds of winning as casino games.

Poker, arguably the most popular gambling game in America, has largely been ignored by casinos. The basic reasons for this are that casino poker games are slower and offer lower proportional winnings than other casino games, and thus, are less exciting for the players and less profitable for the casinos. Playing action in poker is slow because each player must make a decision for each round of betting (and/or discarding) and the casino player must shuffle the cards, deal to each player, calculate the house cut from the pot and make change for the players. Also, because poker is a game of chance whose odds of winning may be dramatically increased by various playing strategies and card-counting, the casual player often feels intimidated when playing against strangers, some of whom may be experts. The game of poker has been extended in various forms to in-casino machines that may be played for money (e.g., video poker). Similarly, poker games have been extended to be played over networks such as the Internet, both as games of pure entertainment and gambling. Also, on the Internet, there are other games of skill (e.g., video games) that players may play for entertainment. These games may be played, for example, within an Internet browser program executing on a personal computer, a cell phone, PDA, or other system.

In such traditional forms of poker and other types of games, winning or losing by a player is determined by each individual round of play. Thus, if a player faces a large loss in an individual game session, he/she is discouraged from proceeding in further sessions for fear that he/she may lose additional money.

SUMMARY OF THE INVENTION

There is a need for new games of skill and chance, especially those that can involve wagering or gambling. However, in traditional gambling or wagering games, players are often intimidated by a single loss, string of losses, or the skill of other players playing the game, and as a result, many players stop playing such games. According to one aspect of the present invention, a new game format is provided that extends the risk of losing a wager over a longer period of time or game sessions. In this manner, the player is motivated to continue playing the game, as the risk of losing is protracted over a longer period of time or over multiple gaming sessions.

In another aspect of the present invention, a prize is awarded to a player that achieves a particular result at the end of a number of gaming sessions. These sessions may be, for example, traditional (or modified) casino-type games such as blackjack, poker, etc., or may be games of skill such as video games or other type games adapted for play on one or more computer systems. Such a game format is beneficial, as a player is generally less intimidated in playing such games, and is more likely to play such games rather than games in a casino-type format where money may be lost in individual sessions. Further, such a game format may also be more favorably viewed by people opposed to gaming. Also, such a game format may be more compliant with gaming laws in particular jurisdictions.

According to one aspect of the present invention, players compete in a "race", and generally attempt to become the sole or co-winner in the race. In one example, advancement in the race is determined by the result of a number of gaming sessions, the result of each session determining the advancement of individual players in the race. For example, if a player wins a particular gaming session, that player may be advanced within the overall race. A winner of the race may be determined, for example, as the first to finish the race (e.g., advance to a predetermined level) or be the player in a leading position at a point when the race is terminated (e.g., after a particular period of time, or after a particular number of game sessions). If a player loses an individual session, there is less disincentive to quit the game, as the risk of losing is spread over a longer period of time or number of gaming sessions. The player will have, for example, in a subsequent gaming session, to advance within the race and "catch" up to other players.

According to another aspect of the present invention, the individual game sessions may be games having fixed odds. These games may be played, for example, in a casino environment, or outside a casino. For instance, a player may subscribe to play multiple game sessions inside a casino or other legal gambling jurisdiction, and play the game outside of the jurisdiction. In one aspect, the games played outside of the legal gambling jurisdiction may be a game of chance, where the player cannot influence the outcome of the game. Because the player pays for the game within the legal gambling jurisdiction and the play of the player has no influence over the outcome of the game, play of the game outside of the legal gambling jurisdiction may be permitted. In some jurisdictions, the player may be limited to subscribing to the multiple game sessions and receiving winnings within a casino or other legal gambling jurisdiction.

According to another aspect of the present invention, the game sessions include a game of "guts" poker as referred to in the art. Guts poker is a card game wherein each player seeks to obtain the best hand possible from an initial dealing of cards without drawing additional cards. In a conventional game of two card guts poker, the dealer deals two cards to each player. If both cards in the player's hand match, then that player has a pair. Otherwise, the hand is called simply by the high card between the two. Although two-card guts poker is common, guts poker can be played with any number of cards (the Monte Carlo version of guts poker involves dealing three cards). In another example, a game five-card guts poker may be played.

In any conventional version of guts poker, each player decides whether or not they will go "in" or "out". Those players who are "out" have no further stake in the game unless the hand is re-dealt. Of those players who are "in", the one with the best hand collects the pot, while the others who called "in" throw into the pot the amount of money that the winner has collected.

In one aspect of the present invention, the game of guts poker is a pure game of chance (e.g., the outcome of the game may not be influenced by game play of the player). In this manner, the game may be subscribed to in a legal gambling jurisdiction and played outside of it. For instance, the player may play and/or view game sessions from a remote location (e.g., through a computer coupled to a game server through the Internet). For instance, the game of guts poker may be modified to eliminate player decisions that influence outcomes (e.g., by removing the decision of whether to go "in" or "out" of a particular hand). For example, the player may always be "in" for each subscribed game sessions or may be declared "in" or "out" (e.g., by a game-playing computer) based on a predetermined set of rules.

In one example of such a guts poker game, different possible poker hands may be assigned different point values, and a winning hand (e.g., among a number of players) may be correlated to an advancement in the race. For instance, a possible hand that has more difficult odds of being obtained may be attributed to a higher advancement in the race. For example, the player may be advanced a farther distance than an inferior hand of another player. Alternatively, only the winning player in each session may be advanced some token advancement. Players may be randomly assigned a hand (e.g., by dealing cards from a 52-card deck as in conventional poker), and the player having the winning hand may be advanced in the race.

There may be more than one session of the game, played periodically. For instance, guts poker sessions may occur once every M minutes or D times per day. Accordingly, there may be intermediate prizes that are awarded (e.g., daily prizes for top scores, fixed odds payouts, etc.). Top scorer prizes may be funded, for example, by a hold percentage of the player's subscription for playing in multiple game sessions. For instance, the top N percentage of scores may be paid out T percentage of revenues. As a result, payouts and winners are expanded and contract along with the number of subscribers. If, for example, 10% of scores are paid 40% of revenues and if there are 100 subscribers that pay $10 each, then the top ten scores are paid collectively ($400). In the event of tie scores, the two or more tied players evenly split the payouts owed to the slots trailing the tier. For instance, if three (3) players tie for second place, those three players split evenly payouts owed to the second, third, and fourth place.

According to another aspect of the invention, fixed odds payouts may include, for example, session outcomes (e.g., a hand in a poker game) that meet particular criteria. For instance, if a player achieves a royal flush, that player may be awarded a fixed odds payout. Such payouts may be independent of any other standing in the overall race, or other payout. Fixed odds payouts may also include prizes awarded during particular periods of time. For instance, if a player is dealt a certain hand at a certain time (e.g., four aces on November 11 (11/11)), the player is awarded a prize.

According to one aspect of the invention, a method of conducting a game comprises acts of providing for an entry of a player into a plurality of game sessions, providing for a race between the player and one or more other players, and playing, by the player, in at least one of the plurality of game sessions having at least one outcome, wherein the at least one outcome of at least one of the plurality of game sessions determines an advancement of the player in the race.

According to one embodiment of the present invention, the method comprises an act of purchasing, by the player, the entry of the player into the plurality of game sessions. According to another embodiment of the present invention, the player pays to enter into the plurality of game sessions with at least one of money, credit, debit, and loyalty program credit. According to another embodiment of the present invention, the method further comprises an act of determining at least one winner among the player and one or more other players. According to another embodiment of the present invention, the method further comprises an act of assigning a random number to the player, the random number determining the advancement of the player in the race.

According to one embodiment of the present invention, at least one of the plurality of game sessions is a poker game, and wherein the method further comprises an act of assigning to a plurality of possible poker hands, respectively, a score for each of the respective possible poker hands, dealing a first poker hand to the player, and, based on the poker hand and the assigned scores, determining a score of the hand, and determining the advancement of the player in the raced based at least in part on the score of the hand.

According to another embodiment of the present invention, the method further comprises an act of determining a player score over a period of time, the player score being based at least in part on the score of the hand. According to another embodiment of the present invention, the period of time is at least one of a predetermined period of time. According to another embodiment of the present invention, the predetermined period of time is at least one of a day, a week, a month and a year. According to another embodiment of the present invention, the method further comprises an act of awarding a prize to a player having a highest score over the period of time. According to another embodiment of the present invention, at least one of the plurality of game sessions is a fixed-odds game. According to another embodiment of the present invention, the method further comprises an act of determining a payout to the player from a predetermined payout table.

According to another embodiment of the present invention, the method further comprises an act of awarding a prize to the player if the first poker hand matches a predetermined poker hand. According to another embodiment of the present invention, the act of awarding a prize further comprises an act of, if the player receives the first poker hand within a predetermined period of time, awarding the prize to the player. According to another embodiment of the present invention, the prize is funded through a percentage of a subscription fee paid to the gaming operator. According to another embodiment of the present invention, the act of awarding a prize further comprises an act of, awarding a plurality of prizes to a top percentage of scores.

According to another embodiment of the present invention, an amount of the plurality of prizes awarded to the top percentage of scores is paid from a predetermined percentage of revenues derived from purchases of player subscriptions. According to another embodiment of the present invention, the method further comprises an act of selecting, from among a plurality of players, a winning player that wins at least one of the plurality of game sessions. According to another embodiment of the present invention, the method further comprises an act of representing, in a visual manner to the player, the advancement of the player in the race. According to another embodiment of the present invention, the act of representing further comprises an act of displaying to the player in an interface of a computer system, the advancement of the player in the race. According to another embodiment of the present invention, the act of representing the player further comprises an act of representing the player as a token displayed in a race track, and representing the advancement of the player visually to the player as a progression along the race track.

According to another embodiment of the present invention, each of the plurality of game sessions is a card game. According to another embodiment of the present invention, each of the plurality of game sessions is a game of guts poker. According to another embodiment of the present invention, at least one of the plurality of game sessions includes a session of guts poker. According to another embodiment of the present invention, the method further comprises an act of representing the player as a token in the race. According to another embodiment of the present invention, the token is advanced based on one or more outcomes of the plurality of game sessions. According to another embodiment of the present invention, the player is permitted to purchase the entry to the plurality of game sessions in a jurisdiction that permits gambling. According to another embodiment of the present invention, the player is permitted to view at least one of the game sessions in an interface at a location outside of a jurisdiction that permits gambling. According to another embodiment of the present invention, at least one player is not required to observe at least one of the plurality of game session to play the at least one of the plurality of game sessions.

According to another embodiment of the present invention, the player is permitted to observe at least one of the plurality of game sessions. According to another embodiment of the present invention, the player is permitted to observe the at least one game session from a location remote from a system that is adapted to conduct the at least one game session. According to another embodiment of the present invention, the player is permitted to observe the at least one game session on at least one of a television, a personal computer, a kiosk, a handheld device, and a telephone having a display. According to another embodiment of the present invention, the method further comprises an act of determining a payout to at least a winner of the race. According to another embodiment of the present invention, the act of determining the payout further comprises an act of determining the payout based on the number of players participating in the race. According to another embodiment of the present invention, the act of determining the payout further comprises an act of determining a hold percentage to be retained by a gaming operator. According to another embodiment of the present invention, the act of determining the payout further comprises determining a payout to at least one winning player from a predetermined payout table. According to another embodiment of the present invention, the player is permitted to enter at least one of the plurality of game sessions through an alternative method of entry (AMOE).

According to another embodiment of the present invention, the method further comprises an act of conducting at least one of the plurality of game sessions, the act of conducting comprises acts of choosing, for the at least one of the plurality of game sessions, winning game content from among game content associated with a plurality of players playing the at least one of the plurality of game sessions and determining at least one winning player, indicating, to the at least one winning player that he/she has won the at least one of the plurality of game sessions, and providing a payout to the at least one winning player. According to another embodiment of the present invention, the act of providing an entry includes an act of entering the player in a series of game sessions of guts poker.

According to another embodiment of the present invention, the series of game sessions of guts poker are played daily, wherein a new hand is dealt at least one of every M minutes and D times per day. According to another embodiment of the present invention, the act of providing for an entry of a player into the plurality of game sessions, wherein the entry of the player does not begin until a game session following the entry. According to another embodiment of the present invention, the act of determining a payout further comprises determining at least one fixed odds payout. According to another embodiment of the present invention, the act of determining a payout further comprises determining at least one payout to at least one of a plurality of players of a group of top scorers. According to another embodiment of the present invention, the group of top scorers within at least one of the plurality of game sessions includes players that finish within at least one of a predetermined ranking of players and predetermined percentage of top scorers. According to another embodiment of the present invention, the at least one of the game sessions is a poker game, and wherein the act of determining at least one fixed odds payout comprises an act of determining a payout for a plurality of goals, at least one of which goals occurs if the player achieves a certain hand during a predetermined period of time, and at least another of the plurality of goals that occurs if the player achieves a particular hand.

Further features and advantages of the present invention as well as the structure of various embodiments of the present invention will be more fully understood from the examples described below with reference to the accompanying drawings. The following examples are intended to illustrate the benefits of the present invention, but do not exemplify the full scope of the invention. All references cited herein are expressly incorporated by reference.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to one aspect, a new game and system and method for conducting the game is provided. A new game format is provided that extends the risk of losing a wager over a longer period of time or game sessions. In this manner, the player is motivated to continue playing the game, as the risk of losing is protracted over a longer period of time or over multiple gaming sessions. In another aspect of the present invention, a prize is awarded to a player that achieves a particular result at the end of a number of gaming sessions. This new game format may be implemented with one or more types of casino games (e.g., poker, blackjack), games of skill (e.g., video games), or games of chance.

Such a new game format may be performed on one or more general-purpose computer systems as discussed further below in relation to FIG. 1. More particularly, a gaming system may be provided that conducts a game having one or more players. In the game, players compete in a number of gaming sessions to achieve an ultimate goal. In one embodiment, the ultimate goal is to win a race, with the players' progress in the race being influenced by each players' success within individual game sessions. These game sessions may be, for example, casino-type games as discussed above, video games or other game type. However, in one embodiment, at least one of the game sessions is a guts poker game played among a number of players.

Figure 3:
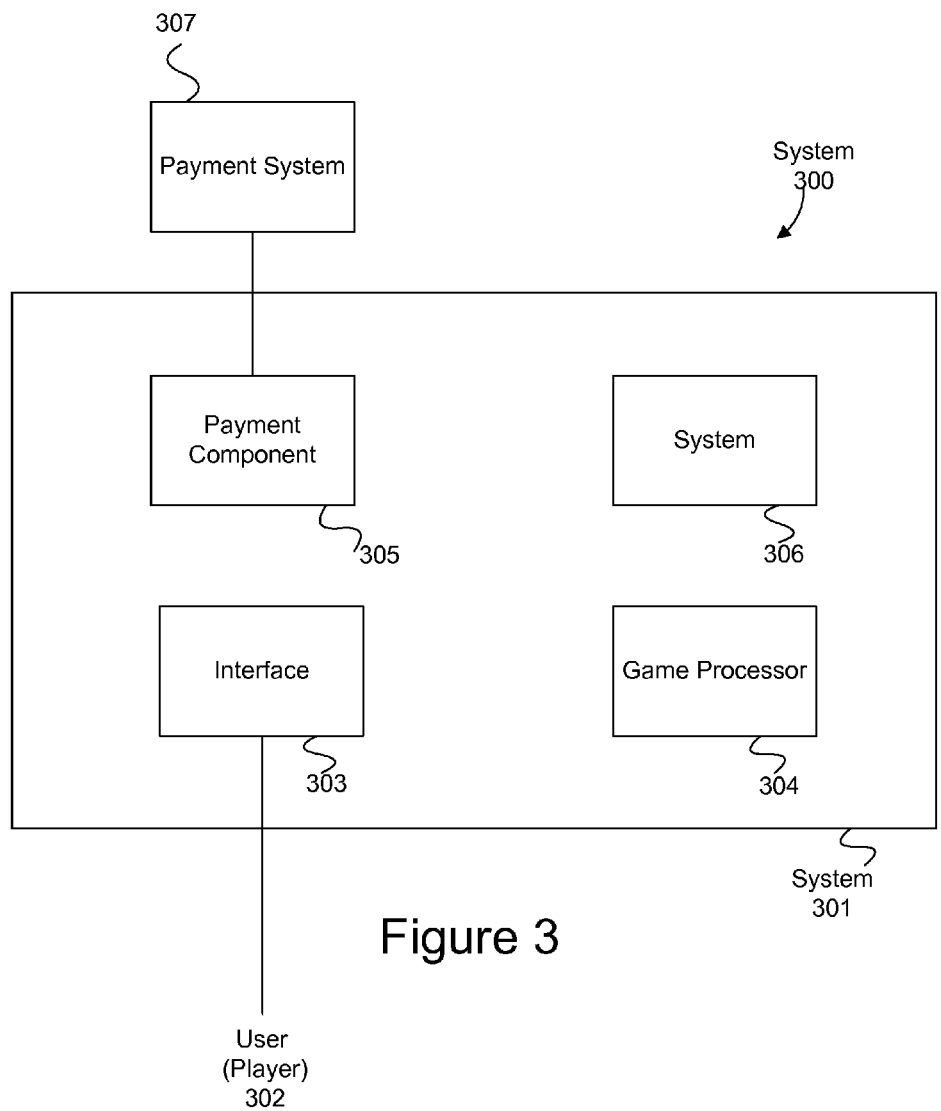
FIG. 3 is a block diagram of a system for operating a plurality of game sessions in accordance with one embodiment of the present invention.

FIG. 3 shows a block diagram of a system for operating a plurality of game sessions in accordance with one embodiment of the present invention. System 300 includes a system, which may be, for example, a general-purpose computer system as described below with reference to FIG. 1, for use by a player in participating in a race format of a game including multiple game sessions.

System 301 includes an interface 303 that interacts with a user (e.g., a player) 302 to place bets and communicate information relating to a game session. Interface 303 may be, for example, an interface of a computer system. In one particular example, interface 303 may include an interface presented by a browser program operating in a memory of a computer system.

System 300 may also include a game processor 304 which performs functions relating to one or more game sessions. Game processor 304 may be, for example, a process executing in a memory of system 301. Processor 304 may receive and process bets placed by users through interface 303, conduct game sessions and rules of the game, and determine wins and payouts to players.

Information relating to game sessions may be stored in one or more storage entities 306 (e.g., a device such as a disk) associated with system 301. Storage 306 may, for example, store information directly relating to game play (e.g., a number of players, current score, current state of game play) or other information relating to game play and payment.

System 301 may also include a payment component 305 that receives payment information from a user 302 through interface 303 to pay for bets placed by the player. Payments may include, for example, wagers placed by players or any additional bets paid by a player in association with playing a game. These bets may include, for example, subscription fees provided by a player for playing multiple game sessions, additional side bets or other wagers. Payment component 305 may communicate with one or more payment systems 307 for the purpose of obtaining payment for playing the game.

Figure 4:
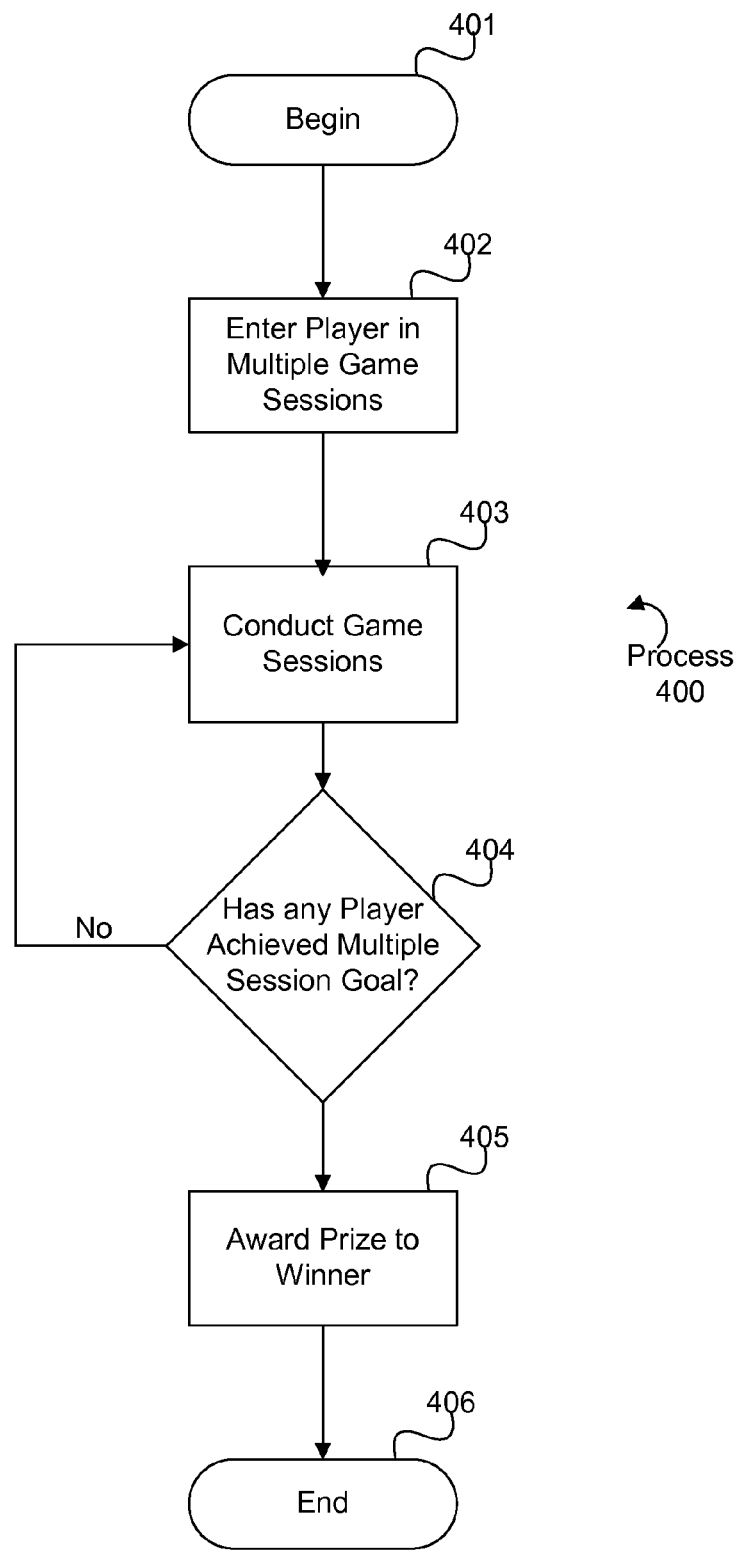
FIG. 4 is a flow chart of a process for playing a plurality of game sessions according to one embodiment of the present invention.

As discussed above, a new game format may be provided that allows players to play against each other in multiple game sessions to achieve a multiple session goal. An example process for playing a number of game sessions involving a multiple session goal is shown in FIG. 4. At block 401, process 400 begins. At block 402, a player is provided the option to enter into multiple game sessions. Entry of the player may be facilitated, for example, by an interface presented by a gaming system (e.g., system 301). In one embodiment, the player pays a subscription fee for entering into the multiple game sessions. This fee may be paid, for example, in a legal jurisdiction such as a casino where gambling or gaming is permitted.

At block 403, a system (e.g., system 301) conducts multiple game sessions. These game sessions may be played through one or more computer systems by multiple players.

At block 404, it is determined whether any player has achieved the multiple session goal. As discussed above, for example, the ultimate goal may be winning a race (e.g., a horse race held between players), but the goal may be any competition goal that measures the relative success of a number of players. As an alternative, for example, the goal may be a particular number of points or number of sessions won by any particular player.

If, at block 404, no player has achieved the goal, game play is continued. Game play may also be limited by time (e.g., a timed game) or limited by a total number of sessions conducted within the overall game. For instance, a game may include ten (10) game sessions, and after the ten game sessions are conducted, the overall game is ended, and a winner is determined. Other limitations may determine how long the game is conducted, and the invention is not limited to any particular method.

If at block 404, a player has achieved the multiple session goal, a prize may be awarded to the winning player. Payout may be one of many types as discussed in more detail below. At block 406, process 400 ends.

Figure 5:
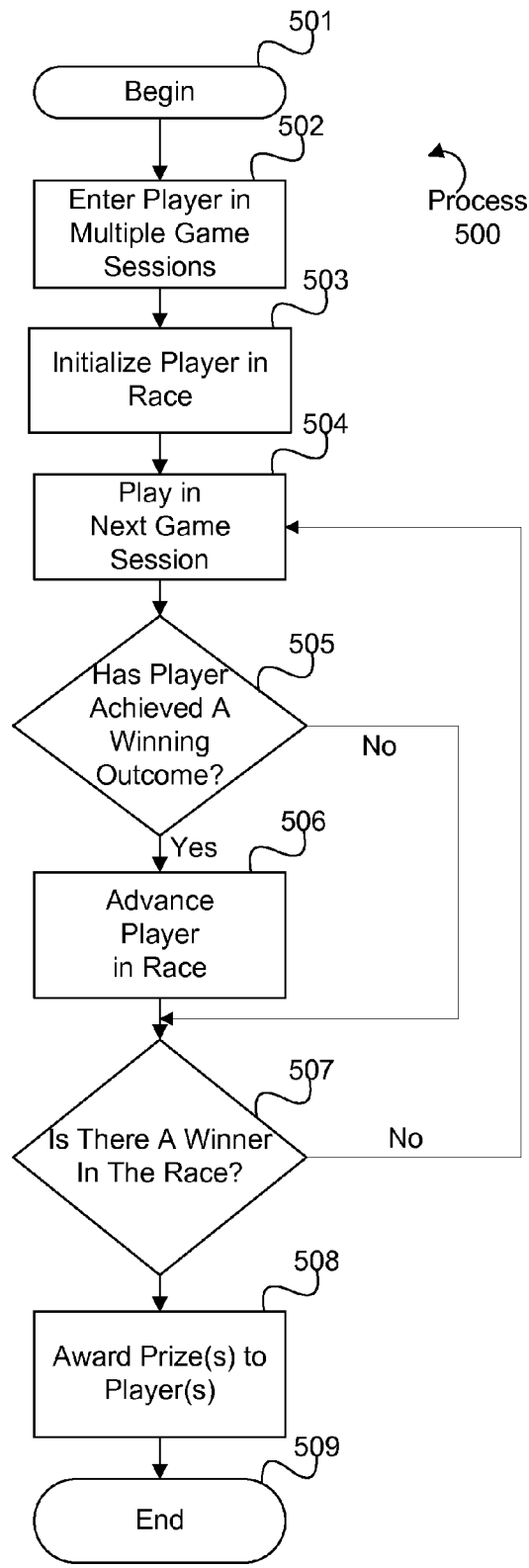
FIG. 5 is a flow chart of a process for playing a plurality of game sessions according to another embodiment of the present invention.

FIG. 5 shows a flowchart of a process for playing a plurality of game sessions according to another embodiment of the present invention. More specifically, a gaming system (e.g., system 301) may conduct one or more game sessions that can be played by a number of players. At block 501, process 500 begins. At block 502, a player is permitted to enter into multiple game sessions. Entry into multiple game sessions may be performed in a similar manner as discussed above with reference to block 402. Each of the players subscribes to play within multiple game sessions against each other. As discussed above, one or more of the game sessions may be a guts poker game.

At block 503, the player is initialized in the race between a number of players. For instance, each of the players may be initialized to the same starting point in the race. Alternatively, players may be started at different points (e.g., in a handicap situation). Each of the players compete against one another to win the race.

At block 504, the players are entered to play in the next game session. Game sessions may be, for example, conducted periodically (e.g., once every predetermined number of minutes or number of times per day). Game sessions may be consecutive, or may have some delay scheduled between them. A game system (e.g., system 301) may conduct the game sessions and interact with players to conduct each session.

At block 505, it is determined whether a player has achieved the winning outcome in a particular game session. In the case of guts poker, for example, the player having the highest-ranked hand may be selected as the winner of the particular session. As discussed, a guts poker game using five cards may be played and points may be attributed to different possible poker hands. If, for instance, the player achieves a hand having the highest point total, that player may be indicating as winning the particular session.

If the player has achieved a winning outcome, the player is advanced within the race at block 506. In one example, only the winner in each session is advanced by some token advancement in the race (e.g., an advancement of one unit). Alternatively, hands may be assigned particular advancements, and each player is advanced by an amount correlated to the particular hand that was achieved. For instance, a royal flush may be correlated to an advancement of five units, whereas a lower ranking hand such as a three-of-a-kind may be correlated to an advancement of three units. It should be appreciated that any advancement scheme may be used and the invention is not limited to any particular scheme.

In one embodiment, the progress of the race may be visually indicated to each player (e.g., in an interface of a computer system). The race may be, for example, represented visually as a horse race between players, and each player may be graphically represented in the race by a token which is advanced (or not advanced) with the outcome of each game session.

At block 507, it is determined whether there is a winner in the race. This may be determined, for example, by a particular player achieving a particular goal (e.g., total number of points exceeding a predetermined amount, number of wins, etc.) or achieving a particular standing within a set amount of time (e.g., in a timed game) or within a fixed number of sessions (e.g., a subscription period lasting over a day, a week, a month, etc.).

At block 508, the system (e.g., system 301) awards one or more prizes to one or more players. The prize may be in the form of a payment, credit, or other type as discussed further below. In a case that players tie, prizes may be split among the tying players. At block 509, process 500 ends.

It should be appreciated that the invention is not limited to processes 400 and 500 as discussed above with reference to FIGS. 4 and 5, but rather these processes may include more or less acts, or may perform them in different orders or frequencies. For instance, the prizes may be awarded periodically during the game for different occurrences within the game or different session outcomes. For instance, if in a guts poker game a player receives a royal flush, then that player may be awarded a fixed odds payout which may be independent of any other payout for the player's standing in the overall race. Other fixed odds of payout may include prizes awarded during other particular periods of time during the game. For instance, if a player is dealt a certain hand at a certain time (e.g., four aces on November 11 (11/11)), the player is awarded a prize. Other payouts may be awarded within particular sessions to encourage players that are behind in the race to continue playing (e.g., awarding larger one-time payouts during later stages of the game).

In at least one of the game sessions, the game played may be a game of chance developed from a wagering game of skill and chance that is played automatically according to a predetermined set of rules. Such games of skill may include card games, such as poker and blackjack, or other games, such as dominoes, craps or backgammon. Such games may be reduced to games of chance, by removing the element of player skill, and allowing such games to be played outside legal gaming jurisdictions. For instance, in a game such as guts poker, the element of choice by the player to go "in" or "out" of a hand based on the dealt cards may be eliminated to reduce the game to a game of chance. In another example, choices made by the player may be made by a game playing computer according to a set of predetermined rules.

Prior to a game, a game player may need to pay for playing. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The game player may pay in person (e.g., by using a cashier in a casino) or through other remote methods including paying by telephone, via a handheld device, a kiosk, a computer through the Internet or other network, and mail. Payment may be in any form that is legal in the particular jurisdiction. Also, rather than a player paying a set amount per game, a player may instead open an account and place money or loyalty points in the account as credit.

In one embodiment of the invention, players may subscribe to play in multiple game sessions. That is, the player pays at one time to play more than one game. These games may be consecutive games, periodically disbursed over a period of time, or other distribution. According to one embodiment, a player may subscribe to play multiple games using a computer-based interface (e.g., a personal computer, a cell phone, a PDA, a set-top box or other interface). These subscribed games may be automatically played (e.g., by a computer system) without the need to interact with the game provider. According to another embodiment, the player may also choose to have his or her subscription automatically renewed. The player may also be able to manage his or her subscription including setting spending limits, time-out periods or password protection.

According to one embodiment of the invention, a player may subscribe to a number of games to be played in the future in a place where wagering games are legal (e.g., in a casino or jurisdiction where wagering is permitted), and may observe and/or play these subscribed games in another location (e.g., on a computer coupled to the Internet, on a cellular phone, PDA, or other system). In this manner, the gaming experience may be extended beyond the legal jurisdiction. It is realized, however, that some jurisdictions require that the gaming activity be located within the jurisdiction, and therefore, one aspect of the present invention relates to locating the system responsible for accepting subscriptions from and making payments to players within a legal jurisdiction. Further, according to one embodiment, games of chance are provided that are developed from games of skill and chance, and therefore the player through his/her remote play does not influence the outcome of the game. Therefore, because the system is located in a legal jurisdiction, and the player does not influence the outcome of the game outside of the legal jurisdiction, the wagering activity may be performed legally. Further, the gaming experience is improved as familiar games of skill and chance are provided in a form that may be played from a remote location.

According to one embodiment of the invention, players may also enter to play this or any other wagering game of chance using an alternative method of entry (AMOE). AMOE is a required available method of entry that does not require a purchase to enter a sweepstake. Sweepstakes are usually used as a promotional or marketing tool. An individual entering a sweepstakes by AMOE is required by law to have the same odds of winning each of the available prizes.

A common AMOE method includes having an individual interested in entering the sweepstakes send in a postcard having his or her name, address or other contact information. Another AMOE method includes having an individual sign on to a free Internet website and submit the required information without payment of a fee. Numerous other methods may be used for AMOE. Most sweepstakes limit the number of times one individual or family may enter a sweepstakes by AMOE.

According to one embodiment of the invention, it is realized that an AMOE (alternative method of entry) may be used to enter a game of chance. More particularly, it is possible to develop, implement and run wagering games of chance, including the inventive games described herein, with an AMOE method of entry. AMOE methods are conventionally used to enter a player in a sweepstakes, which is not considered wagering or gambling. Thus, according to one embodiment of the invention, an individual may enter a wagering game of chance by AMOE using, for example, the postcard or the online method outlined above. The wagering game of chance player entering by AMOE may also have the same odds to win the payout associated with the game in which they are entered. The wagering game of chance player entering by AMOE may also be limited to enter in a predetermined number of games within a given period of time. For example, the AMOE entry may be limited to entry in one game in a period of one year, two games in one month, etc. Other numbers of sessions and given periods may be any number, and the invention is not limited to any particular implementation.

According to one embodiment, the game which the game player enters by AMOE may be determined by the game player on an AMOE entry form. For example, a postcard AMOE may be required to state the date and the time of the game that the game player wants to enter. Alternatively, the game entered by the player may be the next starting game after the AMOE entry form is received and logged. As another alternative, AMOE entries may be assigned to a specific game (s) each hour, day, week or other time interval.

According to one embodiment, a game also has a predetermined payout table associated with it. The payout table may include a listing of the possible methods of obtaining a payout and their payout ratios. The payout ratio is the payout amount in relation to the amount wagered. For instance, if the payout ratio is 1.2:1, then a winning $1.00 bet has a payout of $1.20. The payout amount for each method of winning may depend upon (but may not be rigidly determined by) the odds of obtaining the particular way to obtain a winning outcome. In one embodiment, the payout table may follow a standard payout schedule for playing the original wagering game of skill and chance. However, because the odds for winning are lowered for the gaming operator in this invention, the payout ratios may be adjusted for each method of winning.

The payout table may also be affected if the game is played against the gaming operator or against other players. Typically, if the player is playing against the gaming operator, then the payout table with the payout ratio discussed above may be used. However, if the player is playing against other players, then the payout may be determined by the total amount bet from all the players minus a predetermined commission paid to the gaming operator.

A payout table may also include adjustments for a player's subscription. For instance, the payout may be adjusted according to the player's subscription level. For example, the payout ratio may increase or the gaming operator commission may decrease if the player has a multiple game subscription, multiple card subscription, high payment per game card or hand or any combination of the three. The payout may also be adjusted for numerous other criterion including frequent player credits. Of course, all payout adjustments must meet any legal requirements for the gaming jurisdiction in which the game is played.

A payout table for each game may also be supplemented by a jackpot that transfers from game session to game session. These types of jackpots are commonly referred to as rolling or progressive jackpots. A rolling jackpot may be, for example, the same amount that transfers from game session to game session (or from race to race) until it is paid out. A progressive jackpot is a rolling jackpot that increases as more game sessions are played or may be increased according to some other criterion. Rolling or progressive jackpots are typically paid out for a difficult way to win. For example, a rolling jackpot may be paid to a player that obtains a royal flush in a poker game, as it is realized that the odds of obtaining a royal flush are very small.

The final payout may also be affected by bonus play, which is well-known in the gaming industry. Bonus play generally works to increase some payouts by offering the chance to multiply a payout.

Once a player has paid or entered to play a game, the player may place an opening bet or the computer may place the bet for the player, if the player is placing a set bet per game. After the opening bet is placed, the game is played according to the rules of the game being played. Once the game is started, the game play (and optionally the betting) are partially or fully automated using one or more computer systems. Examples of such computer systems are more fully described below.

When a computer or gaming device plays a game automatically, the computer may determine the play according to rules predetermined for the game. For instance, these rules may be available for players to see in advance. Preferably, the computer or gaming device determines the best play according to the rules for best play according to experts in the game. For example, the best strategy for playing blackjack may be found at www.blackjackinfo.com. However, it should be appreciated that any strategy may be used, and the invention is not limited to any particular strategy.

It should be appreciated that the invention is not limited to any particular game, but rather, any game of skill and chance may be used to develop a game of chance that uses a set of predetermined rules for playing the game.

With blackjack, poker and other games, the computer may also automatically bet for the player after the initial ante. In blackjack, the only possible additional bets in blackjack are determined by the initial ante. These bets are split, double, insurance, and surrender. In traditional poker, the bets are typically more freeform but if the computer plays and bets the game for a player, then the predetermined rules may also include rules that determine how the computer will bet in particular situations.

The game player may view the game proceedings using television, wireless or line telephone with display, handheld device, kiosk, computer, or in person. Depending upon the viewing medium, it may be necessary to download game information prior to viewing while other viewing medium may allow viewing of the streamed game information. For example, the game player may operate a computer that has an Internet-enabled interface (e.g., using Macromedia Flash or Java programming methods) and the computer may display streamed game information within that interface. The game player may also decide not to watch. However, according to one embodiment of the invention, the player need not view the game session to win the game.

The computer system may automatically determine when a player is a winner. Such a result may be automatically authenticated and verified by the computer system. In this instance, the computer system may then notify the game player that he or she has won and the winnings after the computer has consulted the predetermined payout table described above. The notification of winning to a game player may occur by mail, e-mail, computer web or network, telephone, television, pager, fax, kiosk or any other method.

One or more games may proceed concurrently; the parameters of the concurrent game may be the same, similar, or different. Additionally, the games may run continually, i.e. one after another. When one game ends, another game will begin immediately or in a short period of time. The games may follow a precise time schedule so that players know when games will begin. In one specific example, if game play in a game requires four and a half (4.5) minutes to complete, then the next game may start immediately or in thirty seconds to keep to a schedule of games every five minutes (e.g., at :00, :05, :10, :15, :20, :25, :30, :35, :40, :45, :50, :55) of each hour. Because the game sessions may run continually, it may be possible that a game will have no game player playing in a particular game session.

When the computer system automatically determines the winner and play is conducted against other players, the computer system may also determine the game(s), hand(s) or board(s) and the associated player identity(ies) that hold the best chance of winning or is the best at any moment during game play. The computer system may then display the game(s), hand(s) or board(s) or the identity of the game player(s) that is the best to all game players observing the game session. The computer system may also selectively display only one or a subset of all the best games, hand(s) or board(s) or the associated player identity(ies) to a particular game player observing the game session. Additionally when the game is completed, the computer system may display the winning game, hand or board, the winning player's identity and/or the payout.

During the period of time between the games, a game operator may make announcements, rest, or perform any number of actions. If the game is played using a computer system, advertisements, sponsorships, public service announcements or any visual or auditory content may be inserted, for example, into one or more of these periods of time. Advertisements or other content may also be inserted into the game display during a game session.

If the computer automatically plays the games for the players, a game player may access information regarding results of a game remotely after the game is completed. In this manner, a player need not attend or view a particular game session, as the results of each session may be accessed at a later time. Further, the player need not access the game session results from the same interface at which the game was played or subscribed. Remote access may be gained, for example, by kiosk, telephone, television, computer, handheld device or any other device or system that is appropriate. Information that may be accessed about a past game session may include, for example, whether the player won or lost, what the player's payout was or any other information relating to the past game session.

A game player may also be able to replay or review a past game session using a video-enabled device. For instance, a kiosk, a telephone having a display, a television, a computer or handheld device may be used to replay a past game session. By accessing a selected game session in the computer system, a game player may be able to see a past game as it occurred, the winning game and winning game player identity(ies) or possibly any other aspect of the game of interest.

Preferably, according to one embodiment of the invention, game play and betting are partially or fully automated using one or more computer systems. In another embodiment of the invention, game play and betting are fully automated. A computer system may be a single computer capable of executing one or more functions of a game. For instance, the computer may be a supercomputer, minicomputer or a mainframe or personal computer. A computer system used to run a game and its associated sessions may also include any combination of computer system types that cooperate to accomplish system-level tasks. Multiple computer systems may also be used to run a game. The computer system also may include one or more input or output devices, displays, or storage units.

Figure 6:
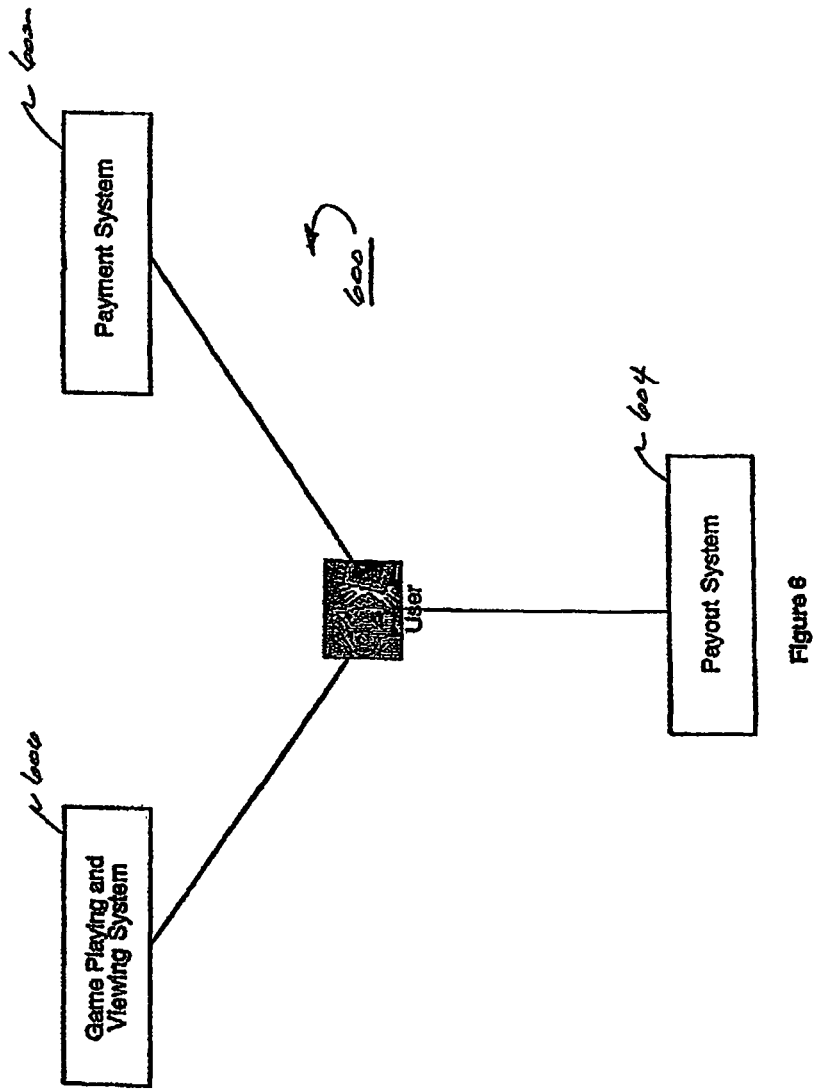
FIG. 6 is a block diagram of a system through which a user may subscribe and play one or more game sessions according to various embodiments of the present invention.

A computer system that executes a game according to various embodiments of the invention may include, for example, one or more system components. One such system 600 is shown by way of example in FIG. 6. In one example, one system component (e.g., payment system 602) may handle payment, subscription and/or AMOE by players to enter the game sessions. Another system component (e.g., system 606) may perform functions relating to playing and viewing the game and the third system component (e.g., system 604) may perform functions relating to performing payouts. Such a game system may also be coupled (e.g., by direct line or network) to other computer systems including systems for handling casino or hotel loyalty programs, reservations, in-room television viewing, gambling floor kiosks, or other systems. Connections to other computer systems may be performed using one or more of the system components described below.

Figure 7:
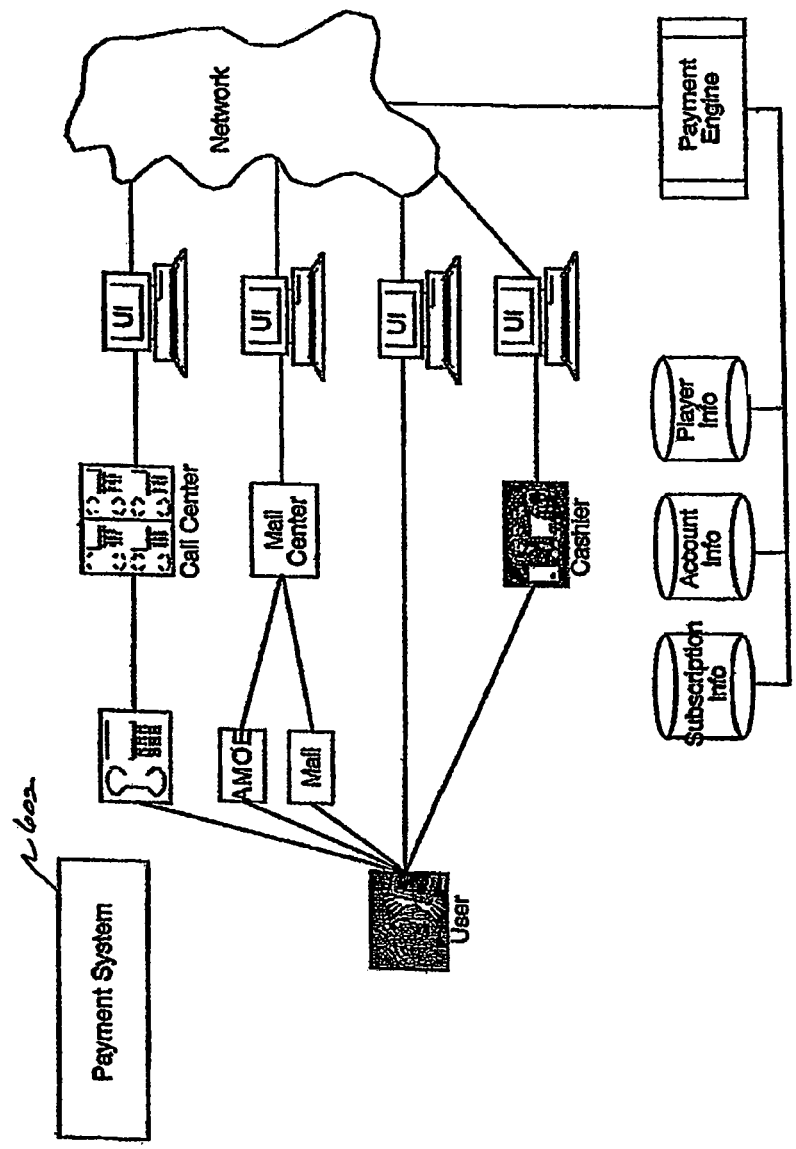
FIG. 7 is a block diagram of a payment system that may be used in association with various aspects of the present invention.

A payment component (e.g., system 602) may include one or many of a number of well-known systems as shown in FIG. 7. For example, a player may be able to pay to play one or more games using a telephone and speaking with a call center representative who inputs player, payment and subscription information manually into a computer using a user interface. In the computer, player, payment and subscription information may be stored in a data structure stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interfaces (GUI), a display screen, a mouse, a keyboard, a keypad, a track ball, a microphone (e.g., to be used in conjunction with a voice recognition system), a speaker, a touch screen, a game controller (e.g., a joystick), etc., and any combinations thereof.

Player information may also be entered into a payment system component. Player information that may be input includes name, address, telephone number and age. Payment information may also include credit or debit card number or loyalty account information. Also, as discussed above, various aspects of the invention relate to subscription gaming for wagering games of chance. Subscription information may be input including, for example, a first game session date and time, number of game sessions to be played, number of game pieces per game session and bet per game piece. Based upon the payment and subscription information, the call center representative may verify that the payment information is valid and enough credit or funds are available for the player's desired subscription.

A similar system may exist for players entering using the mail or a postcard AMOE except the call center may be replaced by a mail center with representatives entering information into a data structure using a user interface. For example, a cashier that works at a casino with players to pay cash to play, may also have the ability to input player, account and subscription information using a user interface of a computer system.

Computer systems or pay engines for handling electronic or online payment and subscriptions may also be used. Such systems are well-known and include such systems as PayPal, iKobo, Verisign, and other systems. Using such a system, a player interacts directly with a user interface to input information into a payment data structure that may be transferred to one or more payment systems (e.g., PayPal).

Various payment systems and one or more user interfaces may be located on computer systems coupled by a network, with the computer system(s) storing data including player, account and subscription information. As used herein, a "network" or a "communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

The above are merely an illustrative embodiment of a payment system component. Such an illustrative embodiment is not intended to limit the scope of the invention, as any of numerous other implementations of the pay system, for example, variations of online payment, are possible and are intended to fall within the scope of the invention. For example, the payment system may include using pay-per-view systems associated with interactive television or the pay engine may additionally deliver a receipt to the player by either e-mail or mail. None of the claims set forth below are intended to be limited to any particular implementation of the payment system unless such claim includes a limitation explicitly reciting a particular implementation.

Figure 8:
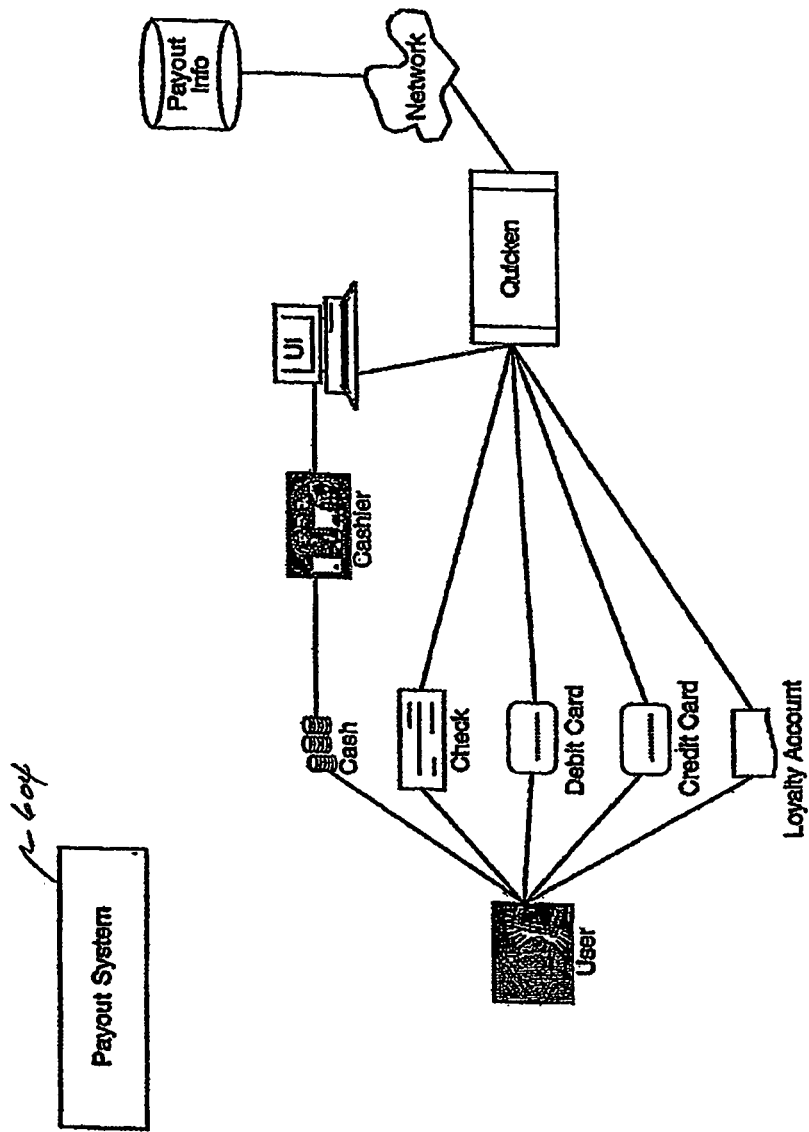
FIG. 8 is a block diagram of a payout system that may be used in association with various aspects of the present invention.

Payout systems are also well-known. Any of a number of standard systems or payout engines for making payouts for winning may be used as shown in FIG. 8. For example, a standard application programming interface such as 'Quicken' (Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of the pay system unless such claim includes a limitation explicitly reciting a particular implementation.

Figure 9:
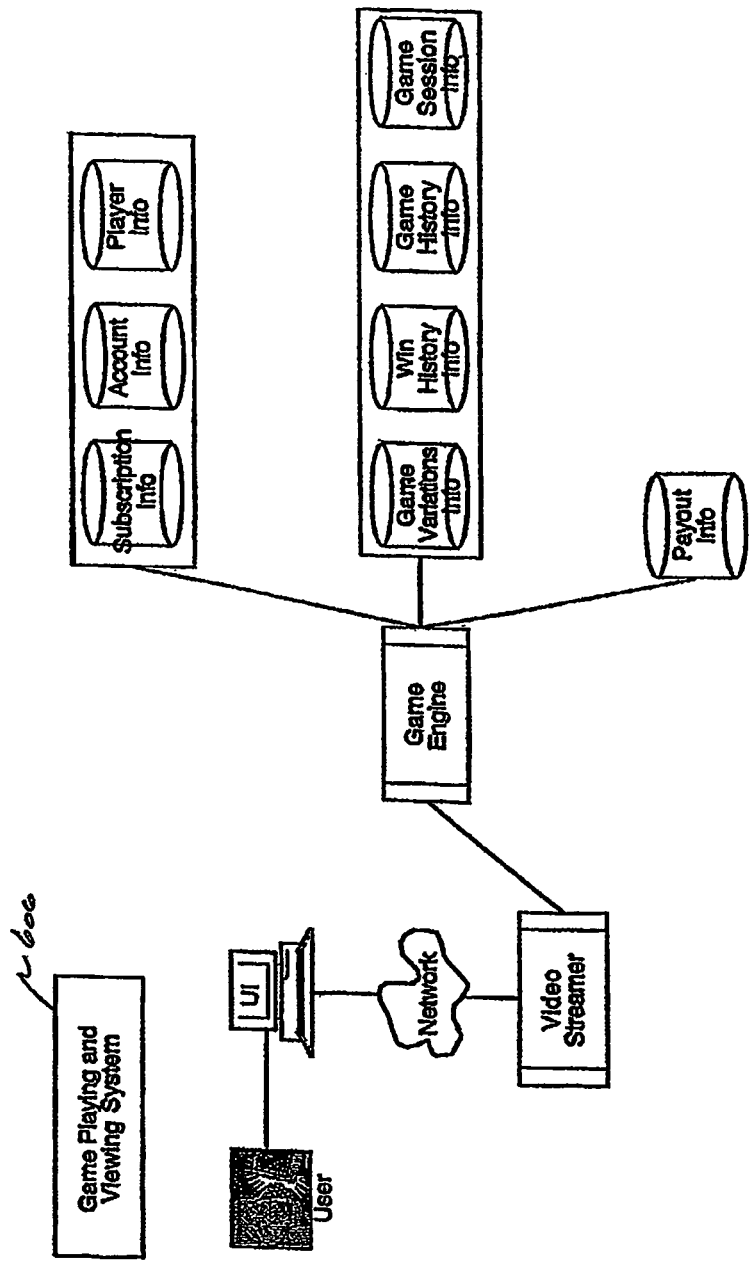
FIG. 9 is a block diagram of a game playing and viewing system according to one embodiment of the present invention.

A game playing and viewing system according to one embodiment of the invention may comprise a number of components for performing specific functions as shown in FIG. 9. The components may include, for example, storage systems or devices that store data structures having information relating to game configuration and game play. For example, such information may include game variation information, present game information, game session history and win history. A game playing and viewing system may also include components used to access payment and payout data structures.

Although the systems and methods described above are described primarily in relation to playing poker in a multiple game session format, it should be appreciated that various aspects of the invention described herein are not limited thereto, but may be applied to other wagering games. For example, systems may be provided to play such games as blackjack, dominoes or backgammon or other games.

The system may also display the winning hand and/or player information to all game players. Winning player information that may be displayed may include name, city, state and country and/or any other identifying information. It may also be possible that winners or winning hands may be selectively displayed to one or more game players. For instance, if numerous winners occur at one time, a player in Bismarck, N. Dak. may be shown only the winning player information or hand that occurs geographically close to him or her, say in Pierre, S. Dak. versus some other location (e.g., Boston, Mass.).

The player may play against one or more players, or may play against the house (e.g., as another player) or play against a dealer (as in the game of blackjack). If the player ties the dealer, then the system may return the player's bet, congratulate the player, thank the player for playing, invite the player to play again or any number of actions. Notification may occur, for example, in a user interface of the system. If the hand is a losing hand or busted, or fails to win during play of multiple sessions, then the player is not a winner and the system retains the player's bet or subscription fee. The system may also notify the player that the hand is not a winner, thank the player for playing or invite the player to play again or any number of actions through one or more user interfaces.

Game play processes 400 and 500 may also include additional acts, and processes 400 and 500 are not limited to the acts. Further, the order of the acts performed as part of processes 400 and 500 are not limited to the order illustrated in FIGS. 4 and 5 as the acts may be performed in other orders, and one or more of the acts may be performed in series or in parallel to one or more other acts, or parts thereof.

Processes 400 and 500 are merely an illustrative embodiment of a method for performing game play (e.g., by a game engine). Such illustrative embodiments are not intended to limit the scope of the invention, as any of numerous other implementations for performing game play. None of the claims set forth below are intended to be limited to any particular implementation of a method of game play unless such claim includes a limitation explicitly reciting a particular implementation.

Processes 400 and 500, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 1, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite or wireless medium to a user interface. If the game is played completely automatically, the user interface may be merely a video terminal including television with no user input means. Viewing access may be controlled by standard means for conditional access including using set top box addresses, telephone numbers or Internet protocol (IP) addresses. Other hardware and/or software may be used for playing and/or viewing game sessions, and the invention is not limited to any particular implementation.

The above is merely an illustrative embodiment of a game playing and viewing system. Such an illustrative embodiment is not intended to limit the scope of the invention, as any of numerous other implementations of a game playing and viewing system, for example, variations of playing and viewing game sessions, are possible and are intended to fall within the scope of the invention. None of the claims set forth below are intended to be limited to any particular implementation of a game playing and viewing system unless such claim includes a limitation explicitly reciting a particular implementation.

System 600, and components thereof such as the payment, payout and game engines, may be implemented using software (e.g., C, C#, C++, Java, or a combination thereof), hardware (e.g., one or more application-specific integrated circuits), firmware (e.g., electrically-programmed memory) or any combination thereof. One or more of the components of 400 may reside on a single system (e.g., the payment subsystem component), or one or more components may reside on separate, discrete systems. Further, each component may be distributed across multiple systems, and one or more of the systems may be interconnected.

Further, on each of the one or more systems that include one or more components of system 600, each of the components may reside in one or more locations on the system. For example, different portions of the components of system 600 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 600 may be implemented on a computer system described below in relation to FIGS. 1 and 2.

System 600 is merely an illustrative embodiment of the game system. Such an illustrative embodiment is not intended to limit the scope of the invention, as any of numerous other implementations of the game system, for example, variations of system 600 are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game play and betting, determining winners and paying winners. It should be appreciated that the system may perform other functions, including network communication, and the invention is not limited to having any particular function or set of functions.

Figure 1:
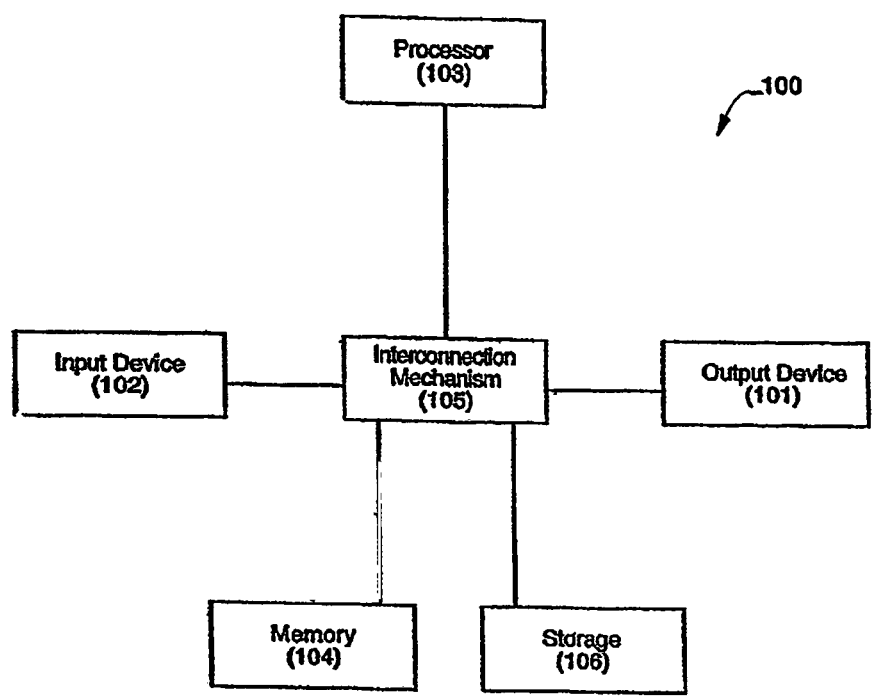
FIG. 1 is a block diagram of a general purpose computer system upon which various embodiments of the invention may be implemented.

For example, various aspects of the invention may be implemented as specialized software executing in a general-purpose computer system 100 such as that shown in FIG. 1. The computer system 100 may include a processor 103 connected to one or more memory devices 104, such as a disk drive, memory, or other device for storing data. Memory 104 is typically used for storing programs and data during operation of the computer system 100. Components of computer system 100 may be coupled by an interconnection mechanism 105, which may include one or more busses (e.g., between components that are integrated within a same machine) and/or a network (e.g., between components that reside on separate discrete machines). The interconnection mechanism 105 enables communications (e.g., data, instructions) to be exchanged between system components of system 100. Computer system 100 also includes one or more input devices 102, for example, a keyboard, mouse, trackball, microphone, touch screen, and one or more output devices 101, for example, a printing device, display screen, speaker. In addition, computer system 100 may contain one or more interfaces (not shown) that connect computer system 100 to a communication network (in addition or as an alternative to the interconnection mechanism 105.

Figure 2:
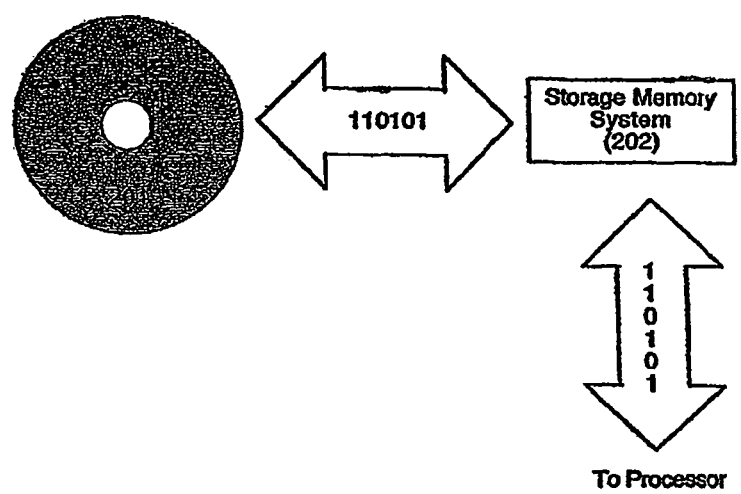
FIG. 2 is a block diagram of a computer data storage system with which various embodiments of the present invention may be practiced.

The storage system 106, shown in greater detail in FIG. 2, typically includes a computer readable and writeable non-volatile recording medium 201 in which signals are stored that define a program to be executed by the processor or information stored on or in the medium 201 to be processed by the program. The medium may, for example, be a disk or flash memory. Typically, in operation, the processor causes data to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM). It may be located in storage system 106, as shown, or in memory system 104, not shown. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is not limited to a particular memory system 104 or storage system 106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components that that shown in FIG. 1.

Computer system 100 may be a general-purpose computer system that is programmable using a high-level computer programming language. Computer system 100 may be also implemented using specially programmed, special purpose hardware. In computer system 100, processor 103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of conducting a game using a game computer, the game computer programmed to implement an entry interface, a game interface and a game engine, the method comprising the acts of:

providing, via the entry interface, for an entry of a first player into a game, the game including a plurality of games sessions;

providing, via the entry interface, for playing, by the first player, in at least one of the plurality of game sessions, wherein the at least one of the plurality of game sessions comprises a race; and providing, via the game engine, for the race between two or more players including the first player, each of the two or more players having a starting point in the race, some of the two or more players having a same starting point different from the starting point of the first player, wherein a winning outcome of the race comprises either finishing the race first or being in a leading position at a predetermined time during the race, and wherein the winning outcome of the race determines an advancement of the first player in the game.

2. The method according to claim 1, further comprising an act of purchasing, by the first player, the entry of the first player into the game.

3. The method according to claim 2, wherein the first player pays to enter the game with at least one of money, credit, debit, and loyalty program credit.

4. The method according to claim 3, wherein the first player is permitted to purchase the entry to the game in a jurisdiction that permits gambling.

5. The method according to claim 3, wherein the first player is permitted to view at least one of the plurality of game sessions in an interface at a location outside of a jurisdiction that permits gambling.

6. The method according to claim 1, further comprising an act of determining at least one winner among the two or more players.

7. The method according to claim 1, further comprising an act of assigning a random number to the first player, the random number at least partially determining the advancement of the first player in the game.

8. The method according to claim 1, wherein at least one of the plurality of game sessions is a poker game, and wherein the method further comprises an act of assigning to a plurality of possible poker hands, respectively, a score for each of the respective possible poker hands, dealing a first poker hand to the first player, and, based on the poker hand and the assigned scores, determining a score of the hand, and determining the advancement of the first player in the game based at least in part on the score of the hand.

9. The method according to claim 8, further comprising an act of determining a player score over a period of time, the player score being based at least in part on the score of the hand.

10. The method according to claim 9, wherein the period of time includes a predetermined time period.

11. The method according to claim 10, wherein the predetermined time period is at least one of a day, a week, a month and a year.

12. The method according to claim 11, further comprising an act of awarding a prize to a player having a highest score over the predetermined time period.

13. The method according to claim 8, further comprising an act of awarding a prize to the first player if the first poker hand matches a predetermined poker hand.

14. The method according to claim 13, wherein the act of awarding a prize further comprises an act of, if the first player receives the first poker hand within a predetermined period of time, awarding the prize to the first player.

15. The method according to claim 13, wherein the prize is funded through a percentage of a subscription fee paid to the gaming operator.

16. The method according to claim 13, wherein the act of awarding a prize further comprises an act of, awarding a plurality of prizes to a top percentage of scores.

17. The method according to claim 16, wherein an amount of the plurality of prizes awarded to the top percentage of scores is paid from a predetermined percentage of revenues derived from purchases of player subscriptions.

18. The method according to claim 1, wherein at least one of the plurality of game sessions comprises a fixed-odds game.

19. The method according to claim 1, further comprising an act of determining a payout to the first player from a predetermined payout table.

20. The method according to claim 1, further comprising an act of selecting, from among a plurality of players, a winning player that wins at least one of the plurality of game sessions.

21. The method according to claim 1, further comprising an act of representing, in a visual manner to the first player, the advancement of the first player in the game.

22. The method according to claim 21, wherein the act of representing further comprises an act of displaying to the first player in an interface of a computer system, the advancement of the first player in the game.

23. The method according to claim 22, wherein the act of representing further comprises an act of representing the first player as a token displayed in a race track, and representing the advancement of the first player visually to the first player as a progression along the race track.

24. The method according to claim 1, wherein at least one of the plurality of game sessions comprises a card game.

25. The method according to claim 1, wherein at least one of the plurality of sessions comprises a game of guts poker.

26. The method according to claim 1, wherein at least one of the plurality of game sessions comprises a session of guts poker.

27. The method according to claim 1, further comprising an act of representing the player as a token in the race.

28. The method according to claim 27, wherein the token is advanced based on one or more outcomes of the plurality of game sessions.

29. The method according to claim 1, wherein at least one player is not required to observe at least one of the plurality of game sessions to play the at least one of the plurality of game sessions.

30. The method according to claim 1, wherein the first player is permitted to observe at least one of the plurality of game sessions.

31. The method according to claim 1, wherein the first player is permitted to observe the at least one of the plurality of game sessions from a location remote from a system that is adapted to conduct the at least one of the plurality of game sessions.

32. The method according to claim 31, wherein the first player is permitted to observe the at least one of the plurality of game sessions on at least one of a televisions, a personal computer, a kiosk, a handheld device, and a telephone having a display.

33. The method according to claim 1, further comprising an act of determining a payout to at least a winner of the race.

34. The method according to claim 33, wherein the act of determining the payout further comprises an act of determining the payout based on the number of players participating in the race.

35. The method according to claim 33, wherein the act of determining the payout further comprises an act of determining a hold percentage to be retained by a gaming operator.

36. The method according to claim 33, wherein the act of determining the payout further comprises an act of determining a payout to at least one winning player from a predetermined payout table.

37. The method according to claim 33, wherein the act of determining a payout further comprises determining at least one fixed odds payout.

38. The method according to claim 37, wherein the at least one of the plurality of game sessions comprises a poker game, and wherein the act of determining at least one fixed odds payout comprises an act of determining a payout for a plurality of goals, wherein at least one of the goals occurs if the first player achieves a certain hand during a predetermined period of time, and at least another of the plurality of goals that occurs if the first player achieves a particular hand.

39. The method according to claim 33, wherein the act of determining a payout further comprises determining at least one payout to at least one of a plurality of players of a group of top scorers.

40. The method according to claim 39, wherein the group of top scorers within at least one of the plurality of game sessions includes players that finish within at least one of a predetermined ranking of players and predetermined percentage of top scorers.

41. The method according to claim 1, wherein the first player is permitted to enter at least one of a plurality of game sessions through an alternative method of entry (AMOE).

42. The method according to claim 1, further comprising an act of conducting at least one of the plurality of game sessions, the act of conducting comprising acts of:
choosing, for the at least one of the plurality of game sessions, winning game content from among game content associated with a plurality of players playing the at least one of the plurality of game sessions and determining at least one winning player;
indicating, to the at least one winning player that the player has won the at least one of the plurality of game sessions; and
providing a payout to the at least one winning player.

43. The method according to claim 1, wherein the act of providing an entry includes an act of entering the first player in a series of game sessions of guts poker.

44. The method according to claim 43, wherein the series of game sessions of guts poker are played daily and wherein a new hand is dealt at least one of every M minutes and D times per day.

45. The method according to claim 1, wherein the act of providing for the entry of the first player into the game comprises entering the first player into the game after at least one of the plurality of game sessions begins.

46. A system for conducting an electronic game, the system comprising:
an entry interface configured to receive an entry of a player into a plurality of electronic game sessions;
a game interface configured to receive, from the player, plays pertaining to at least one of the plurality of electronic game sessions, wherein at least one of the plurality of electronic game sessions comprises a race; and
a game engine configured to conduct the race between a plurality of players that includes the player, each of the plurality of players having a starting point in the race, some of the plurality of players having a same starting point different from the starting point of the player, wherein a winning outcome of the race comprises either finishing the race first or being in a leading position at a predetermined time during the race, and wherein an advancement of the player in the electronic game is determined based on the winning outcome.

* * * * *